United States Patent
Schmutzer et al.

(10) Patent No.: US 11,394,481 B1
(45) Date of Patent: Jul. 19, 2022

(54) EFFICIENT PROCESSING OF TIME-DIVISION MULTIPLEXING BASED SIGNALS

(71) Applicant: Cisco Technology, Inc., San Jose, CA (US)

(72) Inventors: Christian Schmutzer, Koenigsbrunn Im Weinviertel (AT); Raghunandan Annavajjala, Bangalore (IN); Luca Della Chiesa, Cesenatico (IT); Prafull Soni, Karnataka (IN); Anand Brahmanad Agarwal, Bangalore (IN); Jayashree Krishnaswamy, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/337,005

(22) Filed: Jun. 2, 2021

(51) Int. Cl.
*H04L 12/28* (2006.01)
*H04J 3/24* (2006.01)

(52) U.S. Cl.
CPC .................................. *H04J 3/247* (2013.01)

(58) Field of Classification Search
CPC ....... H04L 12/46; H04L 49/50; H04L 5/1469; H04L 45/245; H04J 2203/0094; H04J 2203/0046; H04J 2203/0085; H04J 2203/0064; H04J 3/0632; H04J 3/14; H04J 14/08; Y10S 370/901; Y10S 370/907
See application file for complete search history.

(56) References Cited

U.S. PATENT DOCUMENTS

| 2011/0142036 A1 | 6/2011 | Kim et al. |
| 2020/0092023 A1 | 3/2020 | Brown et al. |
| 2020/0153525 A1 | 5/2020 | Annavajjala et al. |

FOREIGN PATENT DOCUMENTS

| JP | 2010212803 A | 9/2010 |
| KR | 100554170 B1 | 2/2006 |

OTHER PUBLICATIONS

Wikipedia, "Virtual concatenation", https://en.wikipedia.org/wiki/Virtual_concatenation, Jan. 23, 2017, 3 pages.
Wikipedia, "Generic Framing Procedure", https://en.wikipedia.org/wiki/Generic_Framing_Procedure, Jun. 14, 2019, 2 pages.
(Continued)

*Primary Examiner* — Jung Liu
(74) *Attorney, Agent, or Firm* — Edell, Shapiro & Finnan, LLC (57) ABSTRACT

Techniques are described herein for efficient processing of Time-Division Multiplexing (TDM) based signals. In one example embodiment, a system includes a first TDM card, a second TDM card, and a processor in communication with the first TDM card and the second TDM card. The second TDM card hosts an aggregation process configured to aggregate a first TDM based signal and a second TDM based signal into a combined TDM based signal. The processor is configured to obtain a packetized version of the first TDM based signal from the first TDM card and provide the packetized version of the first TDM based signal to the second TDM card. The processor is further configured to prompt one or more packet cards to output packets based on the combined TDM based signal.

20 Claims, 6 Drawing Sheets

(56) References Cited

OTHER PUBLICATIONS

A. Malis et al., Synchronous Optical Network/Synchronous Digital Hierarchy (SONET/SDH) Circuit Emulation over Packet (CEP), Network Working Group, RFC 4842, Apr. 2007, 43 pages.

A. Vainshtein et al., "Structure-Agnostic Time Division Multiplexing (TDM) over Packet (SAToP)", Network Working Group, RFC 4553, Jun. 2006, 27 pages.

Cisco, "Configuration and Verification of Distributed Features on Cisco 75xx and 76xx Routers", downloaded from the Internet May 28, 2021, 29 pages.

Sterling Perrin, "Network Modernization: A TDM to IP Solution", Cisco Systems, downloaded from the Internet May 28, 2021, 8 pages.

Bill Gartner, "Network Modernization: A TDM to IP Solution Webinar and White Paper", Cisco, https://news-blogs.cisco.com/sp/network-modernization-tdm-ip-solution, Sep. 12, 2018, 3 pages.

EFFICIENT PROCESSING OF TIME-DIVISION MULTIPLEXING BASED SIGNALS

TECHNICAL FIELD

The present disclosure relates to computer networking.

BACKGROUND

Several existing technologies can transport frames/packets over a bundle of interfaces/Time-Division Multiplexing (TDM) circuits. Ethernet over Synchronous Optical Networking (SONET)/Synchronous Digital Hierarchy (SDH) (EoS) combined with Virtual Concatenation (VCAT) allows for transporting Ethernet frames over a bundle of multiple Synchronous Transport Signal (STS) circuits/Virtual Circuits (VCs). For example, add/drop multiplexers can use EoS to transport frame-based Generic Framing Protocol-Framed (GFP-F) encapsulated Ethernet frames across a 622 Mbps large "pipe" formed by bundling 4×STS3c (SONET) or 4× VC4 (SDH). Several circuit sizes and bundle members can be chosen to adjust to given bandwidth needs. Similarly, Ethernet over Plesiochronous Digital Hierarchy (PDH) (EoPDH) can be used to carry Ethernet frames over bundled low-speed PDH circuits/interfaces (e.g., Nx VT15). In the router field, bundling DS1/E1 interfaces using Multi-Link Point-to-Point Protocol (MLPPP) or Multi-Link Frame Relay (MLFR) can help carry packets over larger pipes.

DESCRIPTION OF EXAMPLE EMBODIMENTS

Overview

Techniques are described herein for efficient processing of TDM based signals. In one example embodiment, a system includes a first TDM card, a second TDM card, and a processor in communication with the first TDM card and the second TDM card. The second TDM card hosts an aggregation process configured to aggregate a first TDM based signal and a second TDM based signal into a combined TDM based signal. The processor is configured to obtain a packetized version of the first TDM based signal from the first TDM card and provide the packetized version of the first TDM based signal to the second TDM card. The processor is further configured to prompt one or more packet cards to output packets based on the combined TDM based signal.

Example Embodiments

Figure 1:
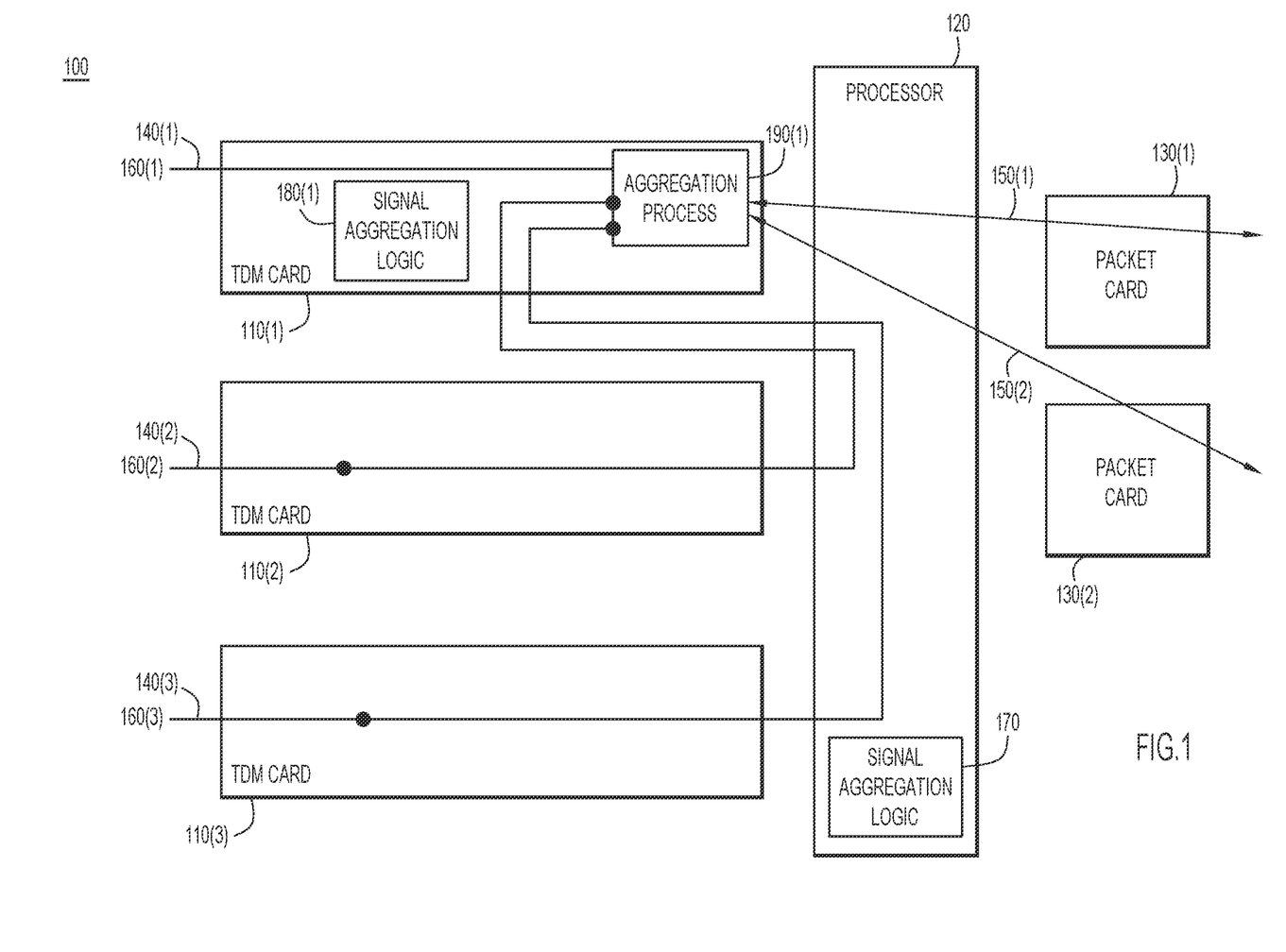
FIG. 1 illustrates a block diagram of a system configured to efficiently process TDM based signals, according to an example embodiment.

FIG. 1 illustrates a block diagram of system 100, which may include a network node (e.g., router) and/or a converged Circuit Emulation (CEM) and routing system. System 100 includes TDM cards 110(1)-110(3), processor 120, and packet cards 130(1) and 130(2). TDM cards 110(1)-110(3) may be TDM trunk cards, and processor 120 may be a Network Processing Unit (NPU).

System 100 is configured to obtain TDM based signals 140(1)-140(3) from a source (e.g., a network or the cloud), convert TDM based signals 140(1)-140(3) to packets 150(1) and 150(2), and provide packets 150(1) and 150(2) to a destination (e.g., a network or the cloud). Packets 150(1) and 150(2) may be encapsulated/decapsulated based on the content of TDM based signals 140(1)-140(3).

System 100 is also configured to obtain packets 150(1) and 150(2) from a source (e.g., a network or the cloud), convert packets 150(1) and 150(2) to TDM based signals 140(1)-140(3), and provide TDM based signals 140(1)-140(3) to a destination (e.g., a network or the cloud). The process of converting packets 150(1) and 150(2) to TDM based signals 140(1)-140(3) may be referring to as "de-packetizing" packets 150(1) and 150(2).

TDM based signals 140(1)-140(3) may include bitstreams carried in circuits 160(1)-160(3), respectively. In this example, circuits 160(1)-160(3) are part of a single circuit bundle, meaning that circuits 160(1)-160(3) belong to the same flow but have been separated into different circuits. For instance, consider a scenario in which a customer purchases a 1 GE physical interface to connect to the cloud. In this scenario, circuits 160(1)-160(3) may each have a bandwidth capacity of 150 Mbits. If the customer purchases three 150 Mbit increments of bandwidth capacity, circuits 160(1)-160(3) would be bundled for the customer to provide a total bandwidth capacity of 450 Mbits.

Conventional techniques would not enable system 100 to accurately packetize TDM based signals 140(1)-140(3) or de-packetize packets 150(1) and 150(2). This is because conventional techniques cannot provide a single point of aggregation (or dis-aggregation) for circuits 160(1)-160(3). In a classic TDM add/drop multiplexer, multiple circuits would enter the multiplexer via multiple TDM trunk ports/cards and cross-connect to a single client card that performs VCAT/GFP. However, system 100 includes multiple packet cards (i.e., packets cards 130(1) and 130(2)), rather than a single client card. In a traditional CEM/routing system, a VCAT engine would reside on each TDM trunk card, and all circuits in a bundle would be required to enter the system on the same TDM card. But system 100 includes multiple circuits 160(1)-160(3) that enter and exit system 100 via respective TDM cards 110(1)-110(3).

Thus, to aggregate or disaggregate circuits 160(1)-160(3), conventional techniques would require TDM based signals 140(1)-140(3) to enter or exit system 100 on the same TDM card, where aggregation or disaggregation would occur. However, in system 100, TDM based signals 140(1)-140(3) enter and exit on respective TDM cards 110(1)-110(3). Accordingly, signal aggregation logic 170 and signal aggregation logic 180(1) are provided in processor 120 and TDM card 110(1), respectively. Signal aggregation logic 170 and 180(1) may enable system 100 to aggregate and/or disaggregate TDM based signals 140(1)-140(3) while permitting TDM based signals 140(1)-140(3) to arrive at and exit from respective TDM cards 110(1)-110(3).

As a result, system 100 may allow unprotected circuit bundles to arrive at and exit from multiple TDM cards. In particular, system 100 may provide flexibility to map any suitable circuit 160(1)-160(3) to any suitable TDM card 110(1)-110(3). As explained in greater detail below in connection with FIGS. 2-4, these techniques may also enable redundancies of circuits 160(1)-160(3) for protection.

In the example of FIG. 1, TDM card 110(1) is nominated to aggregate TDM based signals 140(1)-140(3) using aggregation process 190(1). Aggregation process 190(1), which is hosted on TDM card 110(1), is configured to aggregate TDM based signals 140(1)-140(3) into a combined TDM based signal. Aggregation process 190(1) may perform any suitable operations to re-join the circuit bundle into one flow. This may include packet/frame de-skew, re-ordering, and any other suitable aggregation operations.

As shown, TDM card 110(1) obtains TDM based signal 140(1) via circuit 160(1) and terminates TDM based signal 140(1) directly into aggregation process 190(1). Meanwhile, circuits 160(2) and 160(3)—which arrive at TDM cards 110(2) and 110(3), respectively—are redirected via internal emulation flows across processor 120 to TDM card 110(1). In this example, processor 120 and packet cards 130(1) and 130(2) are configured to handle packets; as a result, TDM cards 110(1)-110(3) may be configured to packetize (or de-packetize) TDM based signals 140(1)-140(3).

Specifically, TDM card 110(2) may obtain TDM based signal 140(2) via circuit 160(2), packetize TDM based signal 140(2), and provide the packetized version of TDM based signal 140(2) to processor 120. Processor 120 may obtain the packetized version of TDM based signal 140(2) and provide the packetized version of TDM based signal 140(2) to TDM card 110(1). Similarly, TDM card 110(3) may obtain TDM based signal 140(3) via circuit 160(3), packetize TDM based signal 140(3), and provide the packetized version of TDM based signal 140(3) to processor 120. Processor 120 may obtain the packetized version of TDM based signal 140(3) and provide the packetized version of TDM based signal 140(3) to TDM card 110(1).

TDM card 110(1) may obtain the packetized versions of TDM based signals 140(2) and 140(3) from processor 120, de-packetize the packetized versions of TDM based signals 140(2) and 140(3) to recover TDM based signals 140(2) and 140(3), and provide TDM based signals 140(2) and 140(3) to aggregation process 190(1). At this point, aggregation process 190(1) has obtained TDM based signals 140(1)-140(3). Accordingly, TDM card 110(1) may aggregate, by aggregation process 190(1), TDM based signals 140(1)-140(3) into a combined TDM based signal.

TDM card 110(1) may further prompt packet cards 130(1) and 130(2) to output packets 150(1) and 150(2) based on the combined TDM based signal. In particular, TDM card 110(1) may extract/decapsulate packets 150(1) and 150(2) from the combined TDM based signal and provide packets 150(1) and 150(2) to processor 120 based on sequence numbers of packets 150(1) and 150(2). Processor 120 may, in turn, prompt packet cards 130(1) and 130(2) to output packets 150(1) and 150(2) based on the combined TDM based signal by providing packets 150(1) and 150(2) to packet cards 130(1) and 130(2).

TDM card 110(1) may also be configured to disaggregate a combined TDM based signal into TDM based signals 140(1)-140(3) using aggregation process 190(1). In this example, TDM based signals 140(1)-140(3) include outgoing TDM based signals, and packets 150(1) and 150(2) include incoming packets. Packets cards 130(1) and 130(2) obtain packets 150(1) and 150(2) and provide packets 150(1) and 150(2) to processor 120, which in turn obtains packets 150(1) and 150(2) and provides packets 150(1) and 150(2) to TDM card 110(1).

TDM card 110(1) obtains packets 150(1) and 150(2) and generates an outgoing combined TDM based signal based on (e.g., by encapsulating) packets 150(1) and 150(2). TDM card 110(1) further generates TDM based signals 140(1)-140(3) based on packets 150(1) and 150(2). For example, TDM card 110(1) may generate TDM based signals 140(1)-140(3) from the outgoing combined TDM based signal using a round-robin mechanism.

TDM card 110(1) may directly output TDM based signal 140(1) via circuit 160(1). TDM card 110(1) may further packetize TDM based signals 140(2) and 140(3) and provide the packetized versions of TDM based signals 140(2) and 140(3) to processor 120. Processor 120 may obtain the packetized versions of TDM based signals 140(2) and 140(3), provide the packetized version of TDM based signal 140(2) to TDM card 110(2), and provide the packetized version of TDM based signal 140(3) to TDM card 110(3). TDM cards 110(2) and 110(3) may de-packetize the packetized versions of TDM based signals 140(2) and 140(3) to recover TDM based signals 140(2) and 140(3) and output TDM based signals 140(2) and 140(3) via circuits 160(2) and 160(3), respectively.

Thus, system 100 may be operable in both directions (i.e., TDM based signals 140(1)-140(3) to packets 150(1) and 150(2), and packets 150(1) and 150(2) to TDM based signals 140(1)-140(3)). In the former direction, system 100 may terminate a circuit bundle, extract packets 150(1) and 150(2) (and/or frames), and cause packets 150(1) and 150(2) to be sent out from packet cards 130(1) and 130(2). For instance, if each circuit 160(1)-160(3) carries 150 Mbits, the individual 150 Mbit bitstreams may be aggregated into a combined TDM signal by aggregating three smaller time slots corresponding to each of circuits 160(1)-160(3) to a single, bigger time slot, and packets 150(1) and 150(2) may be extracted from the combined TDM signal. Conversely, in the latter direction, packets 150(1) and 150(2) may be converted to a combined TDM signal, which is mapped to the bigger time slot, and the combined TDM signal may be spread across circuits 160(1)-160(3) in the three smaller time slots.

Therefore, system 100 may enable packet transport over circuit bundles by processing network traffic for a bundle of circuits 160(1)-160(3) arriving at or exiting from respective TDM cards 110(1)-110(3). System 100 may form a circuit bundle (and a protection group, as explained in greater detail below in connection with FIGS. 2-4) without restricting circuits 160(1)-160(3) to a single TDM port/channel of TDM cards 110(1)-110(3).

TDM card 110(1), TDM card 110(2), and/or processor 120 may comprise one or more tangible (non-transitory) computer readable storage media (e.g., a memory device) encoded with software comprising computer executable instructions. When the software is executed (e.g., by TDM card 110(1), TDM card 110(2), and/or processor 120), the software may be operable to perform operations described herein. In particular, TDM card 110(1), TDM card 110(2), and/or processor 120 include signal aggregation logic 170, 180(1), and/or 180(2), respectively. When executed, signal aggregation logic 170, 180(1), and/or 180(2) enable TDM card 110(1), TDM card 110(2), and/or processor 120 to perform techniques described herein.

Any suitable technology may be used in accordance with the techniques described herein. System 100 may implement Optical Transport Networking (OTN), SONET (e.g., Ethernet over SONET), SDH, PDH (e.g., Ethernet over PDH), and other time slot based mechanisms. Packet cards 130(1) and 130(2) may have corresponding Ethernet ports. In one example, aggregation process 190(1) may be a Virtual Concatenation (VCAT) process that performs GFP-F functions. In another example, aggregation process 190(1) may be a multi-link aggregation process, such as an MLPPP process or an MLFR process.

Furthermore, these techniques may apply to any suitable converged TDM/packet system(s). TDM cards 110(1)-110(3) may be part of a single system/router or belong to multiple systems/routers. While system 100 includes only three TDM cards (i.e., TDM cards 110(1)-110(3)), the techniques described herein may be compatible with any suitable number of TDM cards. Moreover, while aggregation process 190(1) is provided in TDM card 110(1), in other examples aggregation process 190(1) may be provided on TDM card 110(2), TDM card 110(3), or any other suitable entity (e.g., TDM card, chip, etc.) configured to perform circuit bundle aggregation (and/or disaggregation) functions.

Figure 2:
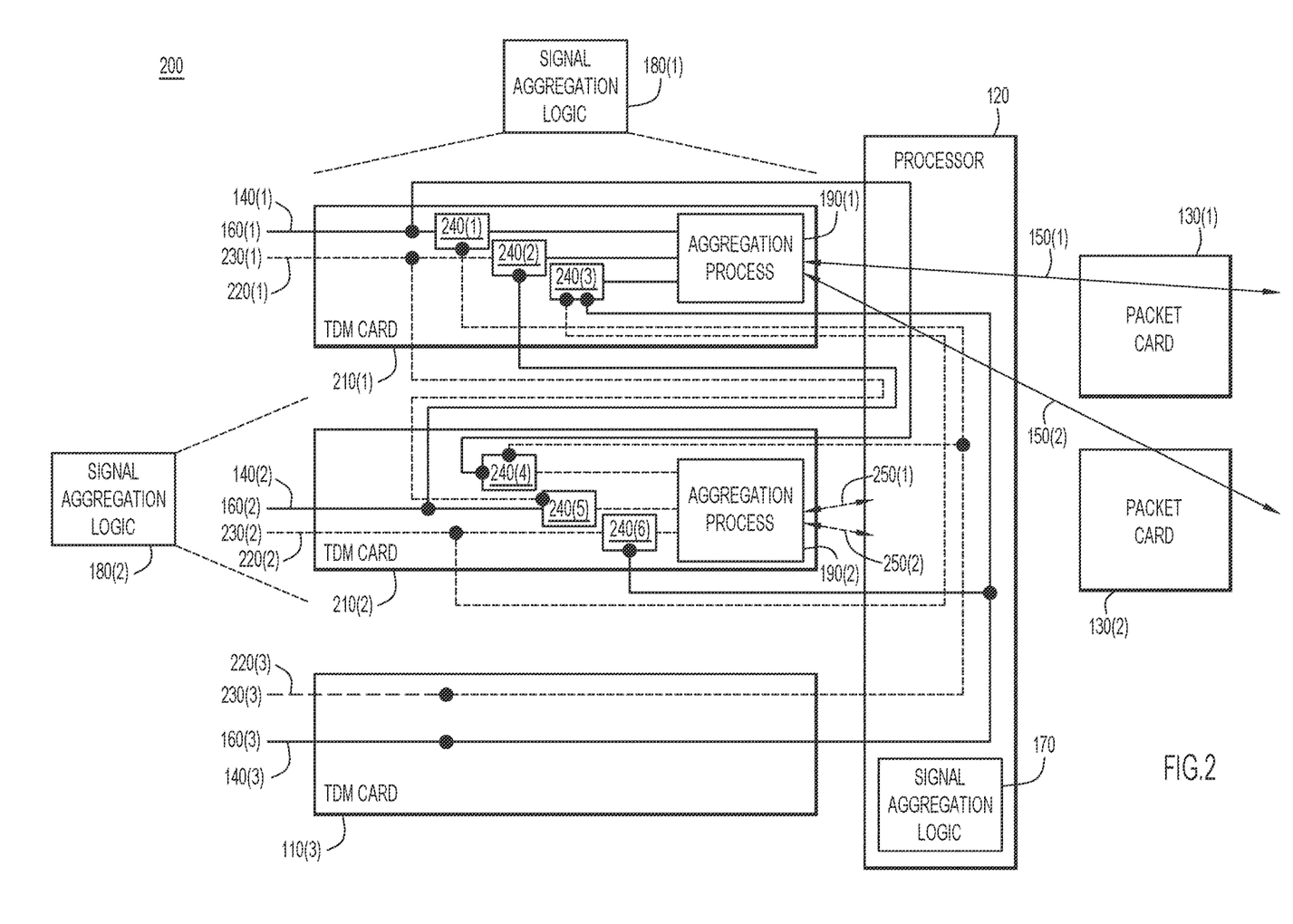
FIG. 2 illustrates a block diagram of a system configured to efficiently process TDM based signals including protection and backup components, according to an example embodiment.

With continuing reference to FIG. 1, FIG. 2 illustrates a block diagram of an example system 200 configured to efficiently process TDM based signals including protection and backup components. System 200 includes TDM cards 210(1), 210(2), and 110(3), processor 120, and packet cards 130(1) and 130(2). Processor 120, TDM card 210(1), and TDM card 210(2) include signal aggregation logic 170, 180(1), and 180(2), respectively.

Signal aggregation logic 170, 180(1), and 180(2) may enable system 200 to provide redundancy protection for TDM based signals 140(1)-140(3) and/or aggregation process 190(1) by leveraging traffic redirection between TDM cards 210(1), 210(2), and 110(3) using emulation and per—circuit bundle redundancy pairs. This may help maintain uninterrupted and efficient packet processing over circuit bundles even in the event of a circuit or TDM card failure. Any suitable redundancy protection technique(s) may be employed on a group or individual basis, such as Unidirectional Path Switch Ring (UPSR), Subnetwork Connection Protection (SNCP), Automatic Protection Switching (APS), Multiplex Section Protection (MSP), etc.

In addition to obtaining TDM based signals 140(1)-140(3), system 200 is also configured to obtain TDM based signals 220(1)-220(3). TDM based signal 220(1) may be a copy of TDM based signal 140(2); TDM based signal 220(2) may be a copy of TDM based signal 140(3); and TDM based signal 220(3) may be a copy of TDM based signal 140(1). TDM based signals 220(1)-220(3) may be carried in circuits 230(1)-230(3), respectively.

In one example, system 200 uses TDM based signals 140(1)-140(3) by default and switches over to one or more of TDM based signals 220(1)-220(3) in the event of a circuit or TDM card failure. As a result, TDM based signals 140(1)-140(3) may be referred to as working TDM based signals, and TDM based signals 220(1)-220(3) may be referred to as protection TDM based signals. Similarly, circuits 160(1)-160(3) may be referred to as working circuits, and circuits 230(1)-230(3) may be referred to as protection circuits.

Additionally, TDM card 210(1) hosts aggregation process 190(1), and TDM card 210(2) hosts aggregation process 190(2). Aggregation process 190(2) may be similar or identical to aggregation process 190(1). In one example, system 200 uses aggregation process 190(1) by default and switches over to aggregation process 190(2) when TDM card 210(1)—which hosts aggregation process 190(1)—fails. As a result, aggregation process 190(1) may be referred to as a working aggregation process, and aggregation process 190(2) may be referred to as a backup aggregation process.

Both TDM cards 210(1) and 210(2) may obtain all the working and protection circuits either directly or through CEM via processor 120. TDM cards 210(1) and 210(2) include circuit selectors 240(1)-240(3) and 240(4)-240(6), respectively, which choose a working or protection circuit to feed into aggregation process 190(1) (instantiated on TDM card 110(1)) or aggregation process 190(2) (instantiated on TDM card 210(1)). Circuit selectors 240(1) and 240(4) are configured to choose between TDM based signal 140(1) and TDM based signal 220(3); circuit selectors 240(2) and 240(5) are configured to choose between TDM based signal 140(2) and TDM based signal 220(1); and circuit selectors 240(3) and 240(6) are configured to choose between TDM based signal 140(3) and TDM based signal 220(2).

In one example, both aggregation process 190(1) and 190(2) process the working and/or protection circuits obtained from circuit selectors 240(1)-240(3) and 240(4)-240(6) and provide corresponding packets 150(1), 150(2), 250(1), and 250(2) to processor 120. Processor 120 may choose which of packets 150(1), 150(2), 250(1), and 250(2) to provide to packet cards 130(1) and 130(2). In this example, processor 120 may choose packets 150(1) and 150(2), which originated from aggregation process 190(1), which is the working aggregation process.

As shown, TDM card 210(1) obtains TDM based signal 140(1) and terminates TDM based signal 140(1) directly into circuit selector 240(1). TDM card 210(1) also obtains TDM based signal 220(1) and terminates TDM based signal 220(1) directly into circuit selector 240(2). Meanwhile, circuits 160(2) and 230(2), which arrive at TDM card 210(2), and circuits 160(3) and 230(3), which arrive at TDM card 110(3), are redirected via internal CEM flows across processor 120 to TDM card 210(1).

Specifically, TDM card 210(2) may obtain TDM based signals 140(2) and 220(2) via circuits 160(2) and 230(2), respectively; packetize TDM based signals 140(2) and 220(2); and provide the packetized version of TDM based signals 140(2) and 220(2) to processor 120. Processor 120 may obtain the packetized version of TDM based signals 140(2) and 220(2) and provide the packetized version of TDM based signals 140(2) and 220(2) to TDM card 210(1). Similarly, TDM card 110(3) may obtain TDM based signals 140(3) and 220(3) via circuits 160(3) and 230(3), respectively; packetize TDM based signals 140(3) and 220(3); and provide the packetized version of TDM based signals 140(3) and 220(3) to processor 120. Processor 120 may obtain the packetized version of TDM based signals 140(3) and 220(3) and provide the packetized version of TDM based signals 140(3) and 220(3) to TDM card 210(1).

TDM card 210(1) may obtain the packetized versions of TDM based signals 140(2), 220(2), 140(3), and 220(3) from processor 120 and de-packetize the packetized versions of TDM based signals 140(2), 220(2), 140(3), and 220(3) to recover TDM based signals 140(2), 220(2), 140(3), and 220(3). TDM card 210(1) may provide TDM based signal 140(2) to circuit selector 240(2); TDM based signals 220(2) and 140(3) to circuit selector 240(2); and TDM based signal 220(3) to circuit selector 240(1).

At this point, circuit selector 240(1) has obtained TDM based signal 140(1) and TDM based signal 220(3); circuit selector 240(2) has obtained TDM based signal 140(2) and TDM based signal 220(1); and circuit selector 240(3) has obtained TDM based signal 140(3) and TDM based signal 220(2). Using circuit selector 240(1), TDM card 210(1)

selects one of TDM based signal 140(1) and TDM based signal 220(3) (here, TDM based signal 140(1)). Using circuit selector 240(2), TDM card 210(1) selects one of TDM based signal 140(2) and TDM based signal 220(1) (here, TDM based signal 140(2)). And using circuit selector 240(3), TDM card 210(1) selects one of TDM based signal 140(3) and TDM based signal 220(2) (here, TDM based signal 140(3)). TDM based signals 140(1)-140(3) may be chosen over TDM based signals 220(1)-220(3) because TDM based signals 140(1)-140(3) are working TDM based signals and TDM based signals 220(1)-220(3) are protection TDM based signals. FIG. 2 shows the selected signals as solid lines and the non-selected signals as dashed lines.

TDM card 210(1) provides TDM based signals 140(1)-140(3) to aggregation process 190(1). Accordingly, TDM card 210(1) may aggregate, by aggregation process 190(1), TDM based signals 140(1)-140(3) into a combined TDM based signal. TDM card 210(1) may further prompt packet cards 130(1) and 130(2) to output packets 150(1) and 150(2) based on the combined TDM based signal. In particular, TDM card 210(1) may extract/decapsulate packets 150(1) and 150(2) from the combined TDM based signal and provide packets 150(1) and 150(2) to processor 120 based on sequence numbers of packets 150(1) and 150(2). Processor 120 may, in turn, prompt packet cards 130(1) and 130(2) to output packets 150(1) and 150(2) based on the combined TDM based signal by providing packets 150(1) and 150(2) to packet cards 130(1) and 130(2).

TDM card 210(1) may also be configured to disaggregate a combined TDM based signal into TDM based signals 140(1)-140(3) using aggregation process 190(1). In this example, TDM based signals 140(1)-140(3) and 220(1)-220(3) include outgoing TDM based signals, and packets 150(1) and 150(2) include incoming packets. Packets cards 130(1) and 130(2) obtain packets 150(1) and 150(2), and provide packets 150(1) and 150(2) to processor 120, which in turn obtains packets 150(1) and 150(2) and provides packets 150(1) and 150(2) to TDM card 210(1).

TDM card 210(1) obtains packets 150(1) and 150(2) and generates an outgoing combined TDM based signal based on (e.g., by encapsulating) packets 150(1) and 150(2). TDM card 210(1) further generates TDM based signals 140(1)-140(3) based on packets 150(1) and 150(2). For example, TDM card 210(1) may generate TDM based signals 140(1)-140(3) from the outgoing combined TDM based signal using a round-robin mechanism.

TDM card 210(1) may duplicate TDM based signals 140(1)-140(3) (e.g., using circuit selectors 240(1)-240(3)) to generate TDM based signals 220(1)-220(3). TDM card 210(1) may directly output TDM based signal 140(1) via circuit 160(1) and TDM based signal 220(1) via circuit 230(1). TDM card 210(1) may further packetize TDM based signals 140(2), 140(3), 220(2), and 220(3) and provide the packetized versions of TDM based signals 140(2), 140(3), 220(2), and 220(3) to processor 120.

Processor 120 may obtain the packetized versions of TDM based signals 140(2), 140(3), 220(2), and 220(3), provide the packetized version of TDM based signals 140(2) and 220(2) to TDM card 210(2), and provide the packetized version of TDM based signals 140(3) and 220(3) to TDM card 110(3). TDM cards 210(2) and 110(3) may de-packetize the packetized versions of TDM based signals 140(2), 140(3), 220(2), and 220(3) to recover TDM based signals 140(2), 140(3), 220(2), and 220(3) and output TDM based signals 140(2), 140(3), 220(2), and 220(3) via circuits 160(2), 160(3), 230(2), and 230(3), respectively. Thus, system 200 may be operable in both directions (i.e., TDM based signals 140(1)-140(3) and 220(1)-220(3) to packets 150(1) and 150(2), and packets 150(1) and 150(2) to TDM based signals 140(1)-140(3) and 220(1)-220(3)).

TDM card 210(2) may also be configured to aggregate TDM based signals 140(1)-140(3) and/or TDM based signals 220(1)-220(3) into a combined TDM based signal using aggregation process 190(2). As shown, TDM card 210(2) obtains TDM based signal 140(2) and terminates TDM based signal 140(2) directly into circuit selector 240(5). TDM card 210(2) also obtains TDM based signal 220(2) and terminates TDM based signal 220(2) directly into circuit selector 240(6). Circuits 160(1) and 230(1), which arrive at TDM card 210(1), and circuits 160(3) and 230(3), which arrive at TDM card 110(3), are redirected via internal CEM flows across processor 120 to TDM card 210(2).

Specifically, TDM card 210(1) may obtain TDM based signals 140(1) and 220(1) via circuits 160(1) and 230(1), respectively; packetize TDM based signals 140(1) and 220(1); and provide the packetized version of TDM based signals 140(1) and 220(1) to processor 120. Processor 120 may, in turn, obtain the packetized version of TDM based signals 140(1) and 220(1) and provide the packetized version of TDM based signals 140(1) and 220(1) to TDM card 210(2). Similarly, TDM card 110(3) may obtain TDM based signals 140(3) and 220(3) via circuits 160(3) and 230(3), respectively; packetize TDM based signals 140(3) and 220(3); and provide the packetized version of TDM based signals 140(3) and 220(3) to processor 120. Processor 120 may, in turn, obtain the packetized version of TDM based signals 140(3) and 220(3) and provide the packetized version of TDM based signals 140(3) and 220(3) to TDM card 210(2).

TDM card 210(2) may obtain the packetized versions of TDM based signals 140(1), 220(1), 140(3), and 220(3) from processor 120 and de-packetize the packetized versions of TDM based signals 140(1), 220(1), 140(3), and 220(3) to recover TDM based signals 140(1), 220(1), 140(3), and 220(3). TDM card 210(2) may provide TDM based signals 140(1) and 220(3) to circuit selector 240(4); TDM based signal 220(1) to circuit selector 240(5); and TDM based signal 140(3) to circuit selector 240(6).

At this point, circuit selector 240(4) has obtained TDM based signal 140(1) and TDM based signal 220(3); circuit selector 240(5) has obtained TDM based signal 140(2) and TDM based signal 220(1); and circuit selector 240(6) has obtained TDM based signal 140(3) and TDM based signal 220(2). Using circuit selector 240(4), TDM card 210(2) selects one of TDM based signal 140(1) and TDM based signal 220(3) (here, TDM based signal 140(1)). Using circuit selector 240(5), TDM card 210(2) selects one of TDM based signal 140(2) and TDM based signal 220(1) (here, TDM based signal 140(2)). And using circuit selector 240(6), TDM card 210(2) selects one of TDM based signal 140(3) and TDM based signal 220(2) (here, TDM based signal 140(3)). FIG. 2 shows the selected signals as solid lines and the non-selected signals as dashed lines.

TDM card 210(2) provides TDM based signals 140(1)-140(3) to aggregation process 190(2). Accordingly, TDM card 210(2) may aggregate, by aggregation process 190(2), TDM based signals 140(1)-140(3) into a backup combined TDM based signal. TDM card 210(2) may extract/decapsulate packets 250(1) and 250(2) from the backup combined TDM based signal and provide packets 250(1) and 250(2) to processor 120 based on sequence numbers of packets 250(1) and 250(2). Because processor 120 is already prompting packets cards 130(1) and 130(2) to output packets 150(1) and 150(2), and because packets 150(1) and 150(2) may be identical to packets 250(1) and 250(2), processor 120 may intentionally drop packets 250(1) and 250(2) instead of sending packets 250(1) and 250(2) to packet cards 130(1) and 130(2). In other examples, however, processor 120 may send both packets 150(1) and 150(2) and packets 250(1) and 250(2) to packet cards 130(1) and 130(2), e.g., for packet redundancy.

While system 200 includes both working/protection circuits and a backup aggregation process, certain systems may include only one of the working/protection circuits and the backup aggregation process. Systems that include working/protection circuits may be protected when a specific working circuit fails; systems that include a backup aggregation process on a separate TDM card may be protected when the TDM card hosting the working aggregation process fails. Certain systems, such as system 100, may not necessarily include either working/protection circuits or a backup aggregation process. Thus, inclusion of working/protection circuits and/or a backup aggregation process may be optional.

Figure 3:
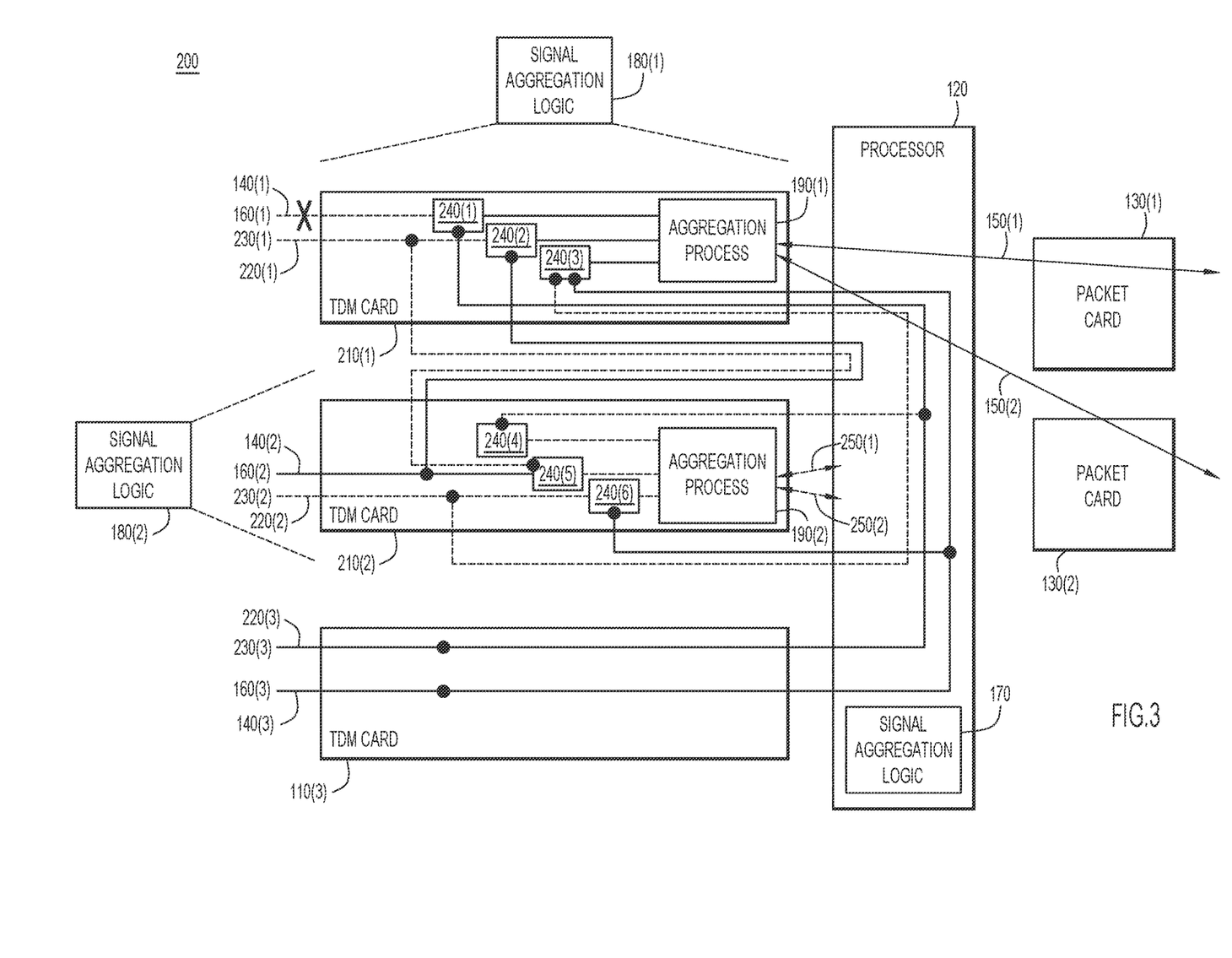
FIG. 3 illustrates a block diagram of the system of FIG. 2 with a circuit path failure, according to an example embodiment.

With continuing reference to FIGS. 1 and 2, FIG. 3 illustrates a block diagram of system 200 with a circuit path failure. In particular, circuit 160(1) has failed, meaning that TDM card 210(1) is no longer receiving TDM based signal 140(1). In response to the failure, circuit 230(3) becomes active and circuit selector 240(1) opts to feed TDM based signal 220(3) to aggregation process 190(1). As discussed above in connection with FIG. 2, TDM based signal 220(3) arrived at TDM card 110(3) via circuit 230(3) and was redirected by processor 120 to TDM card 210(1). Aggregation process 190(1) may thus maintain aggregation operations by combining TDM based signals 140(2) and 140(3) with TDM based signal 220(3) in place of TDM based signal 140(1).

Figure 4:
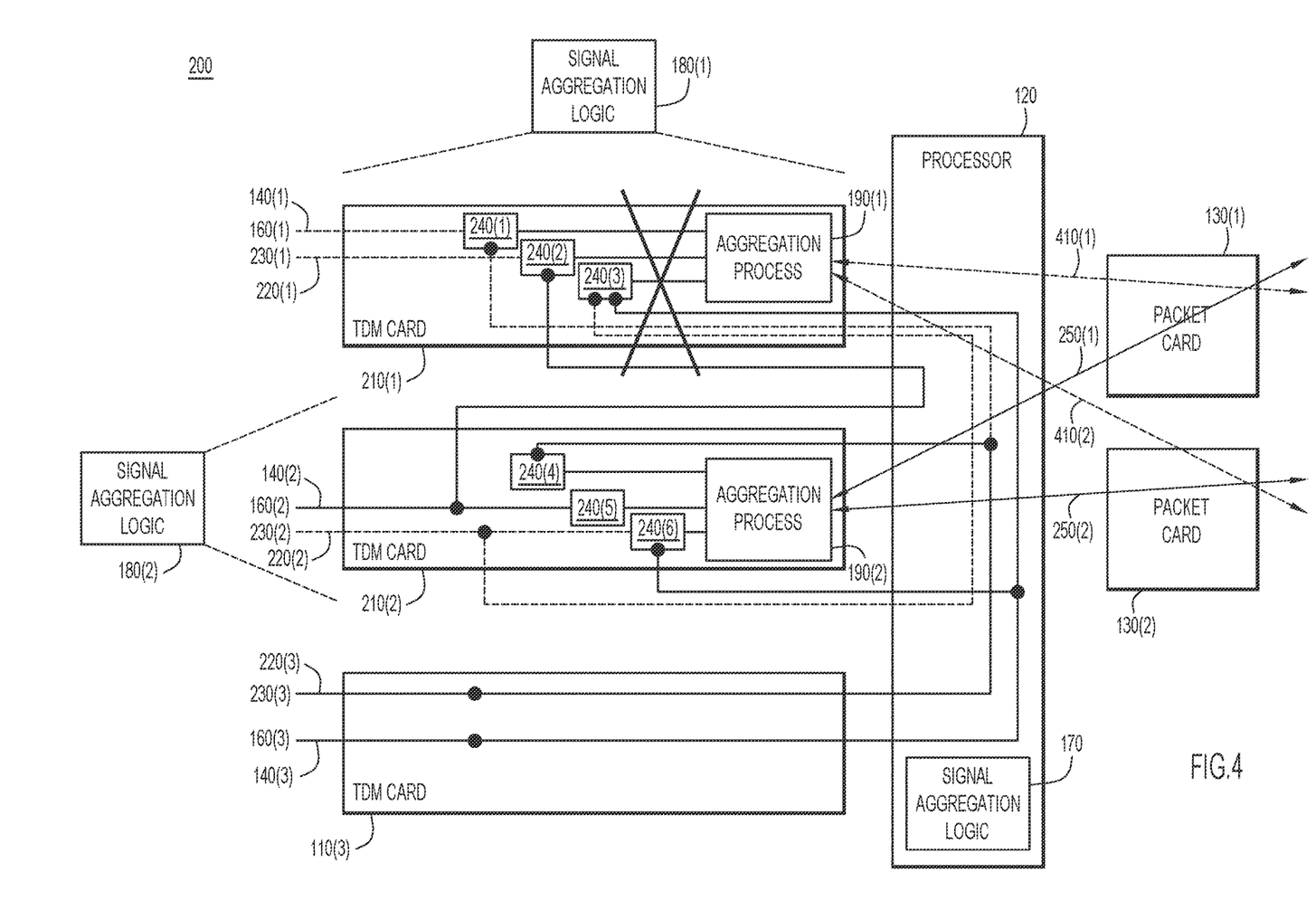
FIG. 4 illustrates a block diagram of the system of FIG. 2 with a TDM card failure, according to an example embodiment.

With continued reference to FIGS. 1 and 2, FIG. 4 illustrates a block diagram of system 200 with a TDM card failure. In particular, TDM card 210(1) has failed, meaning that aggregation process 190(1) is no longer aggregating TDM based signals 140(1)-140(3). As a result, processor 120 is no longer receiving packets 150(1) and 150(2) from TDM card 210(1), as represented by dashed lines 410(1) and 410(2). Also, although TDM based signals 140(1) and 220(1) are continuing to arrive at TDM card 210(1), TDM card 210(1) is no longer sharing TDM based signals 140(1) or 220(1) with TDM cards 210(2) or 110(3) via processor 120 using CEM.

In response to the failure of TDM card 210(1), aggregation process 190(2) may become active. Aggregation process 190(2) previously had access to all circuit traffic streams (i.e., TDM based signals 140(1)-140(3) and 220(1)-220(3)) and was aggregating TDM based signals 140(1)-140(3). Because TDM card 210(1) has failed, the working path of circuit 160(1) was impacted and TDM based signal 140(1) (as well as TDM based signal 220(1)) is no longer available to aggregation process 190(2).

Therefore, circuit selector 240(4) provides TDM based signal 220(3)—instead of TDM based signal 140(1)—to aggregation process 190(2). Circuit selectors 240(5) and 240(6) continue to provide TDM based signals 140(2) and 140(3), respectively, to aggregation process 190(2). Using aggregation process 190(2), TDM card 210(2) aggregates TDM based signals 220(3), 140(2), and 140(3) into a backup combined TDM based signal. Thus, system 200 may implement a protection switch from circuit 160(1) to circuit 230(3), but may refrain from implementing a circuit state protection change for circuits 160(2) or 160(3).

TDM card 210(2) may prompt packet cards 130(1) and 130(2) to output packets 250(1) and 250(2) based on the combined TDM based signal. For example, TDM card 210(2) may extract/decapsulate packets 250(1) and 250(2) from the combined TDM based signal and provide packets 250(1) and 250(2) to processor 120 based on sequence numbers of packets 250(1) and 250(2). Processor 120 may, in turn, prompt packet cards 130(1) and 130(2) to output packets 250(1) and 250(2) based on the combined TDM based signal by providing packets 250(1) and 250(2) to packet cards 130(1) and 130(2).

TDM card 210(2) may also be configured to disaggregate a combined TDM based signal into TDM based signals 140(1)-140(3) and 220(1)-220(3) using aggregation process 190(2). In this example, TDM based signals 140(1)-140(3) and 220(1)-220(3) include outgoing TDM based signals, and packets 250(1) and 250(2) include incoming packets. Packets cards 130(1) and 130(2) obtain packets 250(1) and 250(2) and provide packets 250(1) and 250(2) to processor 120. Processor 120, in turn, obtains packets 250(1) and 250(2) and provides packets 250(1) and 250(2) to TDM card 210(2).

Upon obtaining packets 250(1) and 250(2), TDM card 210(2) may generate an outgoing combined TDM based signal based on (e.g., by encapsulating) packets 250(1) and 250(2). TDM card 210(2) may further generate TDM based signals 220(3), 140(2), and 140(3) based on the outgoing combined TDM based signal. For example, TDM card 210(2) may generate TDM based signals 220(3), 140(2), and 140(3) from the outgoing combined TDM based signal using a round-robin mechanism.

TDM card 210(2) may duplicate TDM based signals 220(3), 140(2), and 140(3) (e.g., using circuit selectors 240(1)-240(3)) to generate TDM based signals 140(1), 220(1), and 220(2). TDM card 210(2) may directly output TDM based signal 140(2) via circuit 160(2) and TDM based signal 220(2) via circuit 230(2). TDM card 210(2) may further packetize TDM based signals 140(1), 140(3), 220(1), and 220(3). TDM card 210(2) may provide the packetized versions of TDM based signals 140(1), 140(3), 220(1), and 220(3) to processor 120.

Processor 120 may obtain the packetized versions of TDM based signals 140(1), 140(3), 220(1), and 220(3), provide the packetized version of TDM based signals 140(1) and 220(1) to TDM card 210(1), and provide the packetized version of TDM based signals 140(3) and 220(3) to TDM card 110(3). Alternatively, processor 120 may choose not to provide the packetized version of TDM based signals 140(1) and 220(1) to TDM card 110(1) because TDM card 110(1) has failed and therefore cannot de-packetize the packetized versions of TDM based signals 140(1) and 220(1). TDM card 110(3) may de-packetize the packetized versions of TDM based signals 140(3) and 220(3) to recover TDM based signals 140(3) and 220(3) and output TDM based signals 140(3) and 220(3) via circuits 160(3) and 230(3), respectively. Thus, system 200 may be operable in both directions (i.e., TDM based signals 220(3), 140(2), and 140(3) to packets 250(1) and 250(2), and packets 250(1) and 250(2) to TDM based signals 220(3), 140(2), and 140(3)).

Figure 5:
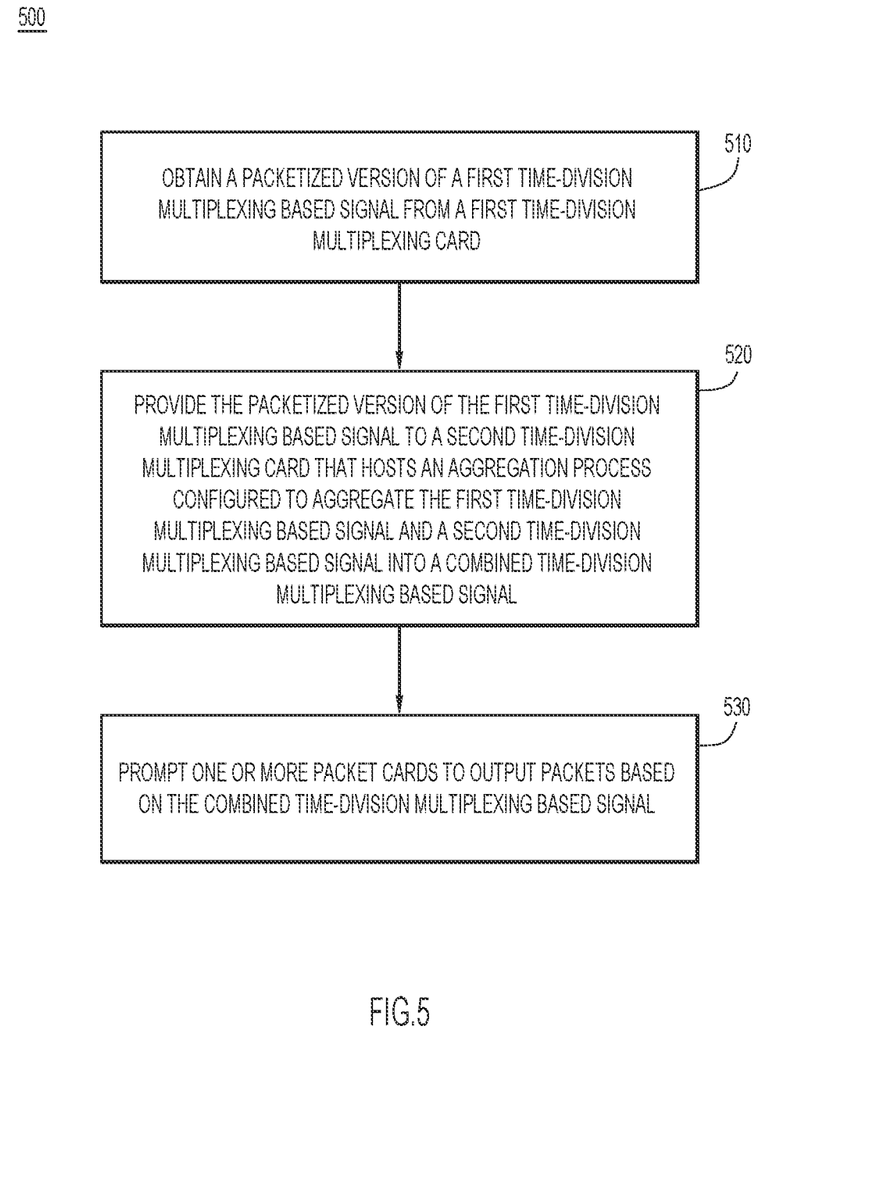
FIG. 5 illustrates a flowchart of a method for performing functions associated with operations discussed herein, according to an example embodiment.

FIG. 5 is a flowchart of an example method 500 for performing functions associated with operations discussed herein. Method 500 may be performed by any suitable entity, such as a processor (e.g., processor 120). At operation 510, the processor may obtain a packetized version of a first TDM based signal from a first TDM card. At operation 520, the processor may provide the packetized version of the first TDM based signal to a second TDM card that hosts an aggregation process configured to aggregate the first TDM based signal and a second TDM based signal into a combined TDM based signal. At operation 530, the processor may prompt one or more packet cards to output packets based on the combined TDM based signal.

Figure 6:
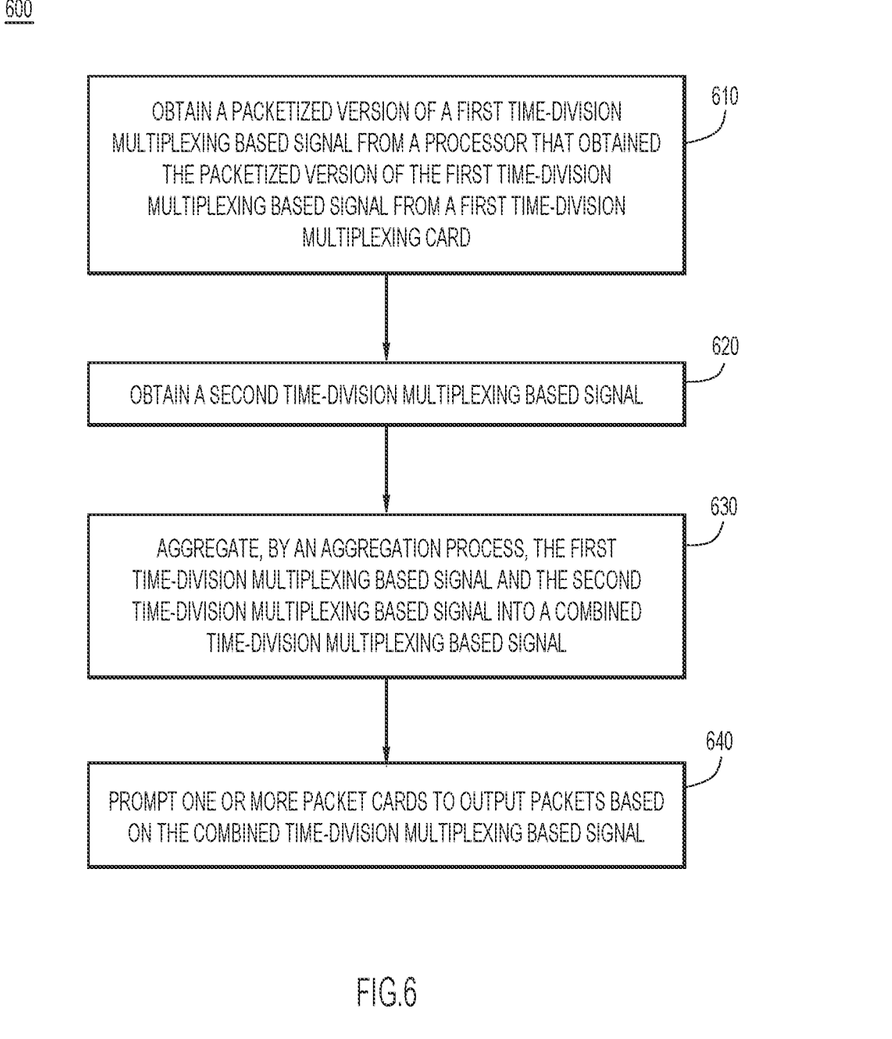
FIG. 6 illustrates a flowchart of another method for performing functions associated with operations discussed herein, according to an example embodiment.

FIG. 6 is a flowchart of an example method 600 for performing functions associated with operations discussed herein. Method 600 may be performed by any suitable entity, such as a TDM card (e.g., TDM cards 110(1) or 210(1)). At operation 610, the TDM card may obtain a packetized version of a first TDM based signal from a processor that obtained the packetized version of the first TDM based signal from a first TDM card (e.g., TDM cards 110(2), 110(3), or 210(2)). At operation 620, the TDM card may obtain a second TDM based signal. At operation 630, the TDM card may aggregate, by an aggregation process, the first TDM based signal and the second TDM based signal into a combined TDM based signal. At operation 640, the TDM card may prompt one or more packet cards to output packets based on the combined TDM based signal.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a system is provided. The system comprises: a first TDM card; a second TDM card that hosts an aggregation process configured to aggregate a first TDM based signal and a second TDM based signal into a combined TDM based signal; and a processor in communication with the first TDM card and the second TDM card, wherein the processor is configured to: obtain a packetized version of the first TDM based signal from the first TDM card; provide the packetized version of the first TDM based signal to the second TDM card; and prompt one or more packet cards to output packets based on the combined TDM based signal.

In one example, the second TDM card is configured to: obtain a working TDM based signal and a protection TDM based signal; select one of the working TDM based signal or the protection TDM based signal; and provide the one of the working TDM based signal or the protection TDM based signal to the aggregation process.

In one example, the first TDM card hosts a backup aggregation process configured to aggregate the first TDM based signal and the second TDM based signal into a backup combined TDM based signal. In a further example, the processor is further configured to: if the second TDM card fails, prompt the one or more packet cards to output further packets based on the backup combined TDM based signal.

In one example, the first TDM card is configured to: obtain the first TDM based signal via a first circuit in a circuit bundle that includes a second circuit configured to carry the second TDM based signal. In a further example, the second TDM card is configured to: obtain the second TDM based signal via the second circuit. In another further example, the system further comprises a third TDM card configured to: obtain the second TDM based signal via the second circuit.

In one example, the aggregation process is a virtual concatenation process.

In one example, the aggregation process is a multi-link aggregation process.

In one example, the second TDM card is configured to: generate a plurality of outgoing TDM based signals based on incoming packets obtained by the one or more packet cards; and provide, to the processor, at least one packetized version of at least one outgoing TDM based signal of the plurality of outgoing TDM based signals.

In one example, the processor is further configured to: obtain the at least one packetized version of the at least one outgoing TDM based signal from the second TDM card; and provide the at least one packetized version of the at least one outgoing TDM based signal to the first TDM card.

In another form, a method is provided. The method comprises: obtaining a packetized version of a first TDM based signal from a first TDM card; providing the packetized version of the first TDM based signal to a second TDM card that hosts an aggregation process configured to aggregate the first TDM based signal and a second TDM based signal into a combined TDM based signal; and prompting one or more packet cards to output packets based on the combined TDM based signal.

In one example, obtaining the packetized version of the first TDM based signal from the first TDM card includes: obtaining the packetized version of the first TDM based signal from a TDM card that hosts a backup aggregation process configured to aggregate the first TDM based signal and the second TDM based signal into a backup combined TDM based signal.

In one example, the method further comprises: if the second TDM card fails, prompting the one or more packet cards to output further packets based on the backup combined TDM based signal.

In one example, the method further comprises: obtaining, from the second TDM card, at least one packetized version of at least one outgoing TDM based signal generated based on incoming packets obtained by the one or more packet cards; and providing the at least one packetized version of the at least one outgoing TDM based signal to the first TDM card.

In another form, another method is provided. The method comprises: obtaining a packetized version of a first TDM based signal from a processor that obtained the packetized version of the first TDM based signal from a first TDM card; obtaining a second TDM based signal; aggregating, by an aggregation process, the first TDM based signal and the second TDM based signal into a combined TDM based signal; and prompting one or more packet cards to output packets based on the combined TDM based signal.

In one example, the method further comprises: obtaining a working TDM based signal and a protection TDM based signal; selecting one of the working TDM based signal or the protection TDM based signal; and providing the one of the working TDM based signal or the protection TDM based signal to the aggregation process.

In one example, the first TDM based signal is carried over a first circuit in a circuit bundle, the method further comprising: obtaining the second TDM based signal via a second circuit in the circuit bundle.

In one example, the aggregation process is a virtual concatenation process.

In one example, the aggregation process is a multi-link aggregation process.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A system comprising:
a first time-division multiplexing card;
a second time-division multiplexing card that hosts an aggregation process configured to aggregate a first time-division multiplexing based signal and a second time-division multiplexing based signal into a combined time-division multiplexing based signal; and
a processor in communication with the first time-division multiplexing card and the second time-division multiplexing card, wherein the processor is configured to:
obtain a packetized version of the first time-division multiplexing based signal from the first time-division multiplexing card;
provide the packetized version of the first time-division multiplexing based signal to the second time-division multiplexing card; and
prompt one or more packet cards to output packets based on the combined time-division multiplexing based signal.

2. The system of claim 1, wherein the second time-division multiplexing card is configured to:
obtain a working time-division multiplexing based signal and a protection time-division multiplexing based signal;
select one of the working time-division multiplexing based signal or the protection time-division multiplexing based signal; and
provide the one of the working time-division multiplexing based signal or the protection time-division multiplexing based signal to the aggregation process.

3. The system of claim 1, wherein the first time-division multiplexing card hosts a backup aggregation process configured to aggregate the first time-division multiplexing based signal and the second time-division multiplexing based signal into a backup combined time-division multiplexing based signal.

4. The system of claim 3, wherein the processor is further configured to:
if the second time-division multiplexing card fails, prompt the one or more packet cards to output further packets based on the backup combined time-division multiplexing based signal.

5. The system of claim 1, wherein the first time-division multiplexing card is configured to:
obtain the first time-division multiplexing based signal via a first circuit in a circuit bundle that includes a second circuit configured to carry the second time-division multiplexing based signal.

6. The system of claim 5, wherein the second time-division multiplexing card is configured to:
obtain the second time-division multiplexing based signal via the second circuit.

7. The system of claim 5, further comprising a third time-division multiplexing card configured to:
obtain the second time-division multiplexing based signal via the second circuit.

8. The system of claim 1, wherein the aggregation process is a virtual concatenation process.

9. The system of claim 1, wherein the aggregation process is a multi-link aggregation process.

10. The system of claim 1, wherein the second time-division multiplexing card is configured to:
generate a plurality of outgoing time-division multiplexing based signals based on incoming packets obtained by the one or more packet cards; and
provide, to the processor, at least one packetized version of at least one outgoing time-division multiplexing based signal of the plurality of outgoing time-division multiplexing based signals.

11. The system of claim 10, wherein the processor is further configured to:
obtain the at least one packetized version of the at least one outgoing time-division multiplexing based signal from the second time-division multiplexing card; and
provide the at least one packetized version of the at least one outgoing time-division multiplexing based signal to the first time-division multiplexing card.

12. A method comprising:
obtaining a packetized version of a first time-division multiplexing based signal from a first time-division multiplexing card;
providing the packetized version of the first time-division multiplexing based signal to a second time-division multiplexing card that hosts an aggregation process configured to aggregate the first time-division multiplexing based signal and a second time-division multiplexing based signal into a combined time-division multiplexing based signal; and
prompting one or more packet cards to output packets based on the combined time-division multiplexing based signal.

13. The method of claim 12, wherein obtaining the packetized version of the first time-division multiplexing based signal from the first time-division multiplexing card includes:
obtaining the packetized version of the first time-division multiplexing based signal from a time-division multiplexing card that hosts a backup aggregation process configured to aggregate the first time-division multiplexing based signal and the second time-division multiplexing based signal into a backup combined time-division multiplexing based signal.

14. The method of claim 13, further comprising:
if the second time-division multiplexing card fails, prompting the one or more packet cards to output further packets based on the backup combined time-division multiplexing based signal.

15. The method of claim 12, further comprising:
obtaining, from the second time-division multiplexing card, at least one packetized version of at least one outgoing time-division multiplexing based signal generated based on incoming packets obtained by the one or more packet cards; and
providing the at least one packetized version of the at least one outgoing time-division multiplexing based signal to the first time-division multiplexing card.

16. A method comprising:
obtaining a packetized version of a first time-division multiplexing based signal from a processor that obtained the packetized version of the first time-division multiplexing based signal from a first time-division multiplexing card;
obtaining a second time-division multiplexing based signal;
aggregating, by an aggregation process, the first time-division multiplexing based signal and the second time-division multiplexing based signal into a combined time-division multiplexing based signal; and
prompting one or more packet cards to output packets based on the combined time-division multiplexing based signal.

17. The method of claim 16, further comprising:
obtaining a working time-division multiplexing based signal and a protection time-division multiplexing based signal;
selecting one of the working time-division multiplexing based signal or the protection time-division multiplexing based signal; and
providing the one of the working time-division multiplexing based signal or the protection time-division multiplexing based signal to the aggregation process.

18. The method of claim 16, wherein the first time-division multiplexing based signal is carried over a first circuit in a circuit bundle, the method further comprising:
obtaining the second time-division multiplexing based signal via a second circuit in the circuit bundle.

19. The method of claim 16, wherein the aggregation process is a virtual concatenation process.

20. The method of claim 16, wherein the aggregation process is a multi-link aggregation process.

* * * * *